(12) United States Patent
Shekher (10) Patent No.: US 9,387,771 B1
(45) Date of Patent: Jul. 12, 2016

(54) ELECTRIC VEHICLE CHARGING PORT LOCK

(71) Applicant: Rahul Shekher, Redwood City, CA (US)

(72) Inventor: Rahul Shekher, Redwood City, CA (US)

( * ) Notice: Subject to any disclaimer, the term of this patent is extended or adjusted under 35 U.S.C. 154(b) by 101 days.

(21) Appl. No.: 14/272,380

(22) Filed: May 7, 2014

Related U.S. Application Data

(60) Provisional application No. 61/822,413, filed on May 12, 2013.

(51) Int. Cl.
*B60L 11/18* (2006.01)

(52) U.S. Cl.
CPC .......... *B60L 11/1838* (2013.01); *B60L 11/1818* (2013.01); *Y02T 10/7005* (2013.01); *Y02T 90/14* (2013.01)

(58) Field of Classification Search
CPC ...... H01R 29/00; H01R 23/025; H01R 13/64; H01R 2103/00; H01R 13/7032; H01R 24/46; H01R 31/08; H01R 31/02; Y02T 90/14; Y02T 10/7005; Y02T 90/128; Y02E 60/12; G01R 31/3648
See application file for complete search history.

(56) References Cited

U.S. PATENT DOCUMENTS

| | | | | |
|---|---|---|---|---|
| 8,262,402 B2* | 9/2012 | Gaul | ............ | B60L 11/1825 320/109 |
| 8,311,690 B2* | 11/2012 | Tanaka | ............ | B60K 6/48 180/65.1 |
| 8,560,147 B2* | 10/2013 | Taylor | ............ | H02J 7/00 340/5.8 |
| 2010/0211643 A1* | 8/2010 | Lowenthal | ............ | B60L 3/0069 709/206 |
| 2010/0228405 A1* | 9/2010 | Morgal | ............ | B62H 3/02 701/2 |
| 2011/0227531 A1* | 9/2011 | Rajakaruna | ............ | B60L 3/0069 320/109 |
| 2013/0255333 A1* | 10/2013 | Kurumizawa | ............ | E05B 83/28 70/237 |
| 2014/0232338 A1* | 8/2014 | Fontana | ............ | B60L 11/1824 320/109 |
| 2014/0266004 A1* | 9/2014 | Andrews, Jr. | ............ | B60L 11/005 320/104 |

* cited by examiner

*Primary Examiner* — Michael Zarroli (57) ABSTRACT

A system and method for locking a charging connector inserted into a charging port is disclosed. The insertion of the charging connector into the charging port is identified. The charging port or charging connector may be placed into a locked state such that the charging connector cannot be disconnected from the charging port. The charging port or charging connector may be placed into an unlocked state in response to a battery charge level or an owner signal.

17 Claims, 7 Drawing Sheets

ELECTRIC VEHICLE CHARGING PORT LOCK

RELATED APPLICATION

This application claims the benefit under 35 U.S.C. §119 (e) of U.S. Provisional Application 61/822,413 filed on May 12, 2013 and is incorporated by reference in its entirety.

FIELD

The present disclosure is related to the field of charging ports. In some embodiments, the present disclosure relates to an electric vehicle charging port lock.

BACKGROUND

Conventional electric vehicles are typically charged by connecting an electrical charging cord from a wall outlet or a charging station into a charging port of the electric vehicle. The battery of the electric vehicle may thus be charged by the electrical connection from the charging station to the electric vehicle that is provided by the inserting of the charging cord into the charging port. Charging stations are commonly provided in public areas to allow for a driver of an electric vehicle to charge the battery of his or her electric vehicle while he or she is away (e.g., while at work, shopping, etc.). While the owner is not monitoring the electric vehicle while its battery is being charged, other people may disconnect the electric vehicle from the charging station by unplugging the charging cord that has been inserted into the charging port of the electric vehicle. Such behavior may interfere with the owner's use and enjoyment of the electric vehicle, as the battery may not be fully charged as expected when the owner returns to the electric vehicle.

Accordingly, it is highly desirable to develop systems and methods for an electric vehicle charging port lock. Such systems and methods may prevent the non-authorized unplugging of a charging cord that has been inserted into the charging port of the electric vehicle.

BRIEF DESCRIPTION OF THE DRAWINGS

The novel features of the disclosure are set forth in the appended claims. However, for purpose of explanation, several embodiments of the disclosure are set forth in the following figures.

DETAILED DESCRIPTION

The systems and methods disclosed herein relate to electric vehicles. In some embodiments, the systems and methods relate to an electric vehicle charging port lock.

In the following detailed description, numerous specific details are set forth in order to provide a thorough understanding of the present disclosure. However, it will become obvious to those skilled in the art that the present disclosure may be practiced without these specific details. The description and representation herein are the means used by those experienced or skilled in the art to most effectively convey the substance of their work to others skilled in the art. In other instances, well known methods, procedures, and systems have not been described in detail to avoid unnecessarily obscuring aspects of the present disclosure.

Figure 1:
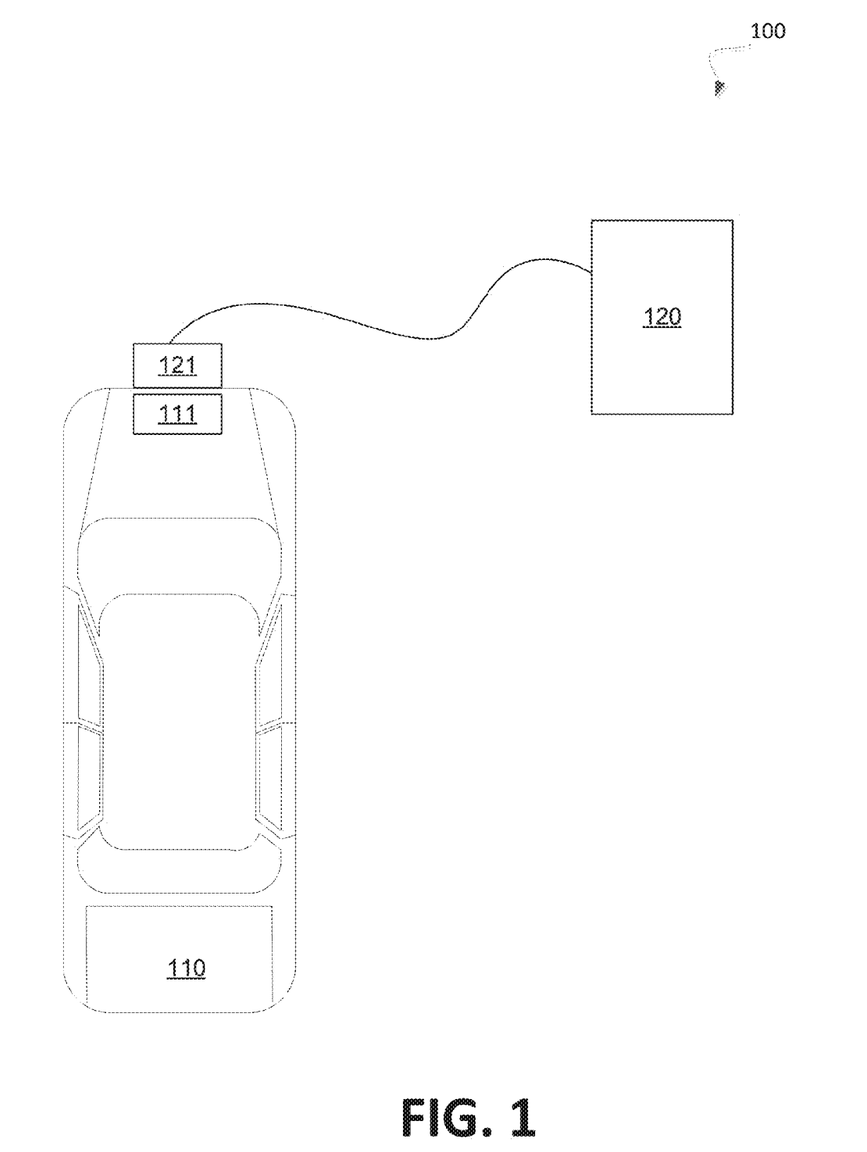
FIG. 1 illustrates a diagram of an example electric vehicle charging environment in accordance with some embodiments.

FIG. 1 illustrates a diagram of an example electric vehicle charging environment 100 in accordance with some embodiments. As shown, the environment 100 may include an electric vehicle 110 (e.g., an electric car, truck, van, sport utility vehicle, motorcycle, bicycle, etc.) and a charging station 120. The electric vehicle 110 may be associated with a battery that is used to power the motor of the electric vehicle 110. In some embodiments, the battery of the electric vehicle 110 may be powered or charged by coupling the electric vehicle 110 to the charging station 120. For example, the charging station 120 may provide or output an electrical current. The electric vehicle 110 may include an electrical charge port 111 that may include electrical contacts for the purpose of establishing an electrical connection with the charging station 120. For example, a charging connector 121 (also referred to as a charging cable, charging cord, charging wire, etc.) may be inserted into the electrical charging port 111. In some embodiments, such an electrical connection may result in the charging of the battery of the electric vehicle 110 by electricity from the charging station 120 by way of the charging connector 121 being inserted into the electrical charging port 111.

As such, an electrical charging port of an electric vehicle may be coupled to a charging station or a charging outlet (e.g., a wall outlet) by an electrical charging connector or cable in order to recharge or power the electric vehicle's battery.

Figure 2:
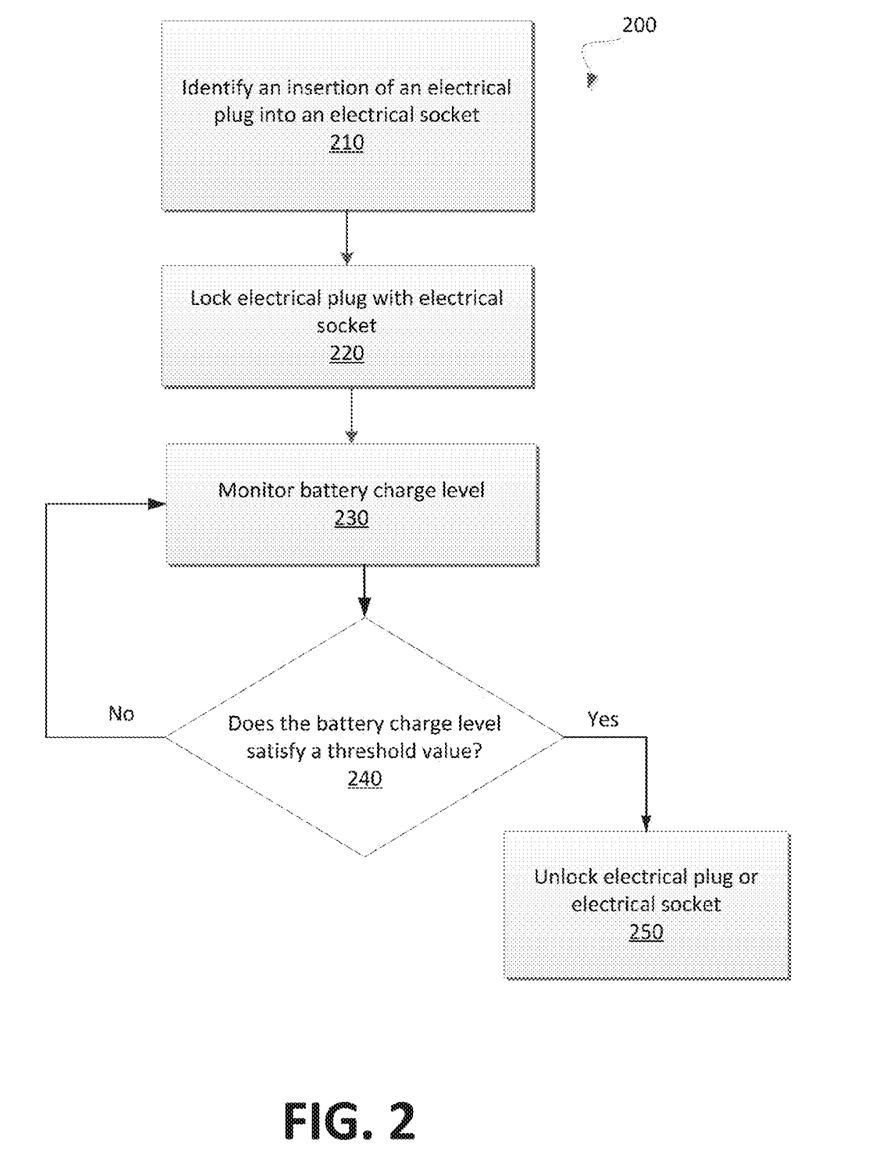
FIG. 2 illustrates a flow diagram of an example method for locking the electrical charging port of an electric vehicle in accordance with some embodiments.

FIG. 2 illustrates a flow diagram of an example method 200 for locking the charging connector inserted into an electrical charging port associated with an electric vehicle in accordance with some embodiments. In general, the method 200 may lock into place a charging connector (e.g., charging connector 121) that has been inserted into an electrical charging port (e.g., electrical charging port 111) of an electric vehicle (e.g., electric vehicle 110) based on a current charge level of a battery of the electric vehicle.

As shown in FIG. 2, at step 210, the insertion of a charging connector into the charging port may be identified. For example, the establishing of an electrical connection between the charging connector and the charging port (e.g., by electrical contacts or prongs of the charging connector) may be identified or detected. In some embodiments, such an establishment of an electrical connection or insertion of the charging connector into the charging port may be identified by the flow of electricity entering the electrical connections of the charging port. At step 220, the charging connector may be locked in the charging port. In some embodiments, the locking of the charging connector into the charging port may result in the inability to remove the charging connector from the charging port. As such, the charging connector may be prevented from being removed while in the charging port is in a locked state. For example, the charging connector may be inserted into the charging port and the charging port may be placed into a locked state to lock the charging connector into the charging port. As such, the charging connector may not be removed or disconnected from the charging port while the charging port is in a locked state. In some embodiments, the locking of the charging connector into the charging port may be based on a mechanical lock. For example, the charging connector may include one or more holes or slots and the charging port may include one or more prongs that may be extended into the one or more holes or slots of the charging connector when the charging port is placed into the locked state. In another embodiment, the locking mechanism may be based on a magnetic lock. For example, the charging connector and/or the charging port may include magnetic components. A magnetic component of the charging port or charging connector may be activated to lock the charging connector into the charging port. One skilled in the art will recognize that any type of locking mechanism may be employed with this disclosure.

At step 230, the electric charge level of a battery may be monitored. For example, the charge level of the battery of the electric car may be monitored. At step 240, a determination may be made with regard to the charge level of the battery. For example, if the charge level does not meet or satisfy (e.g., is less than) a threshold value, then the monitoring of the battery charge level may continue and the charging port may remain in the locked state. However, if the charge level does meet or satisfy the threshold value (e.g., the charge level is at or exceeds the threshold value), then at step 250, the charging connector may be unlocked from the charging port. For example, the charging port may be switched from the locked state to an unlocked state where the charging connector is no longer locked into the charging port and may thus be removed from the charging port.

In some embodiments, the owner of the electric vehicle may set or determine the threshold value at which the charging connector may be disconnected from the charging port (e.g., when the charging port may switch from the locked state to the unlocked state). For example, the owner may input a threshold value from a control system located within the interior of the electric vehicle.

As such, a charging connector may be inserted into a charging port. The charging port may be configured to be placed into a locked state such that the inserted charging connector is locked into the charging port and may not be disconnected from the charging port. The charging port may be configured to switch from the locked state to the unlocked state in response to a charge level of a battery of the electric vehicle. For example, if the charge level of the battery is at full capacity or exceeds or meets (i.e., satisfies) a threshold value or threshold percentage of charge capacity of the battery, then the charging port may be configured to be in an unlocked state such that the charging connector may then be disconnected from the charging port.

Figure 3:
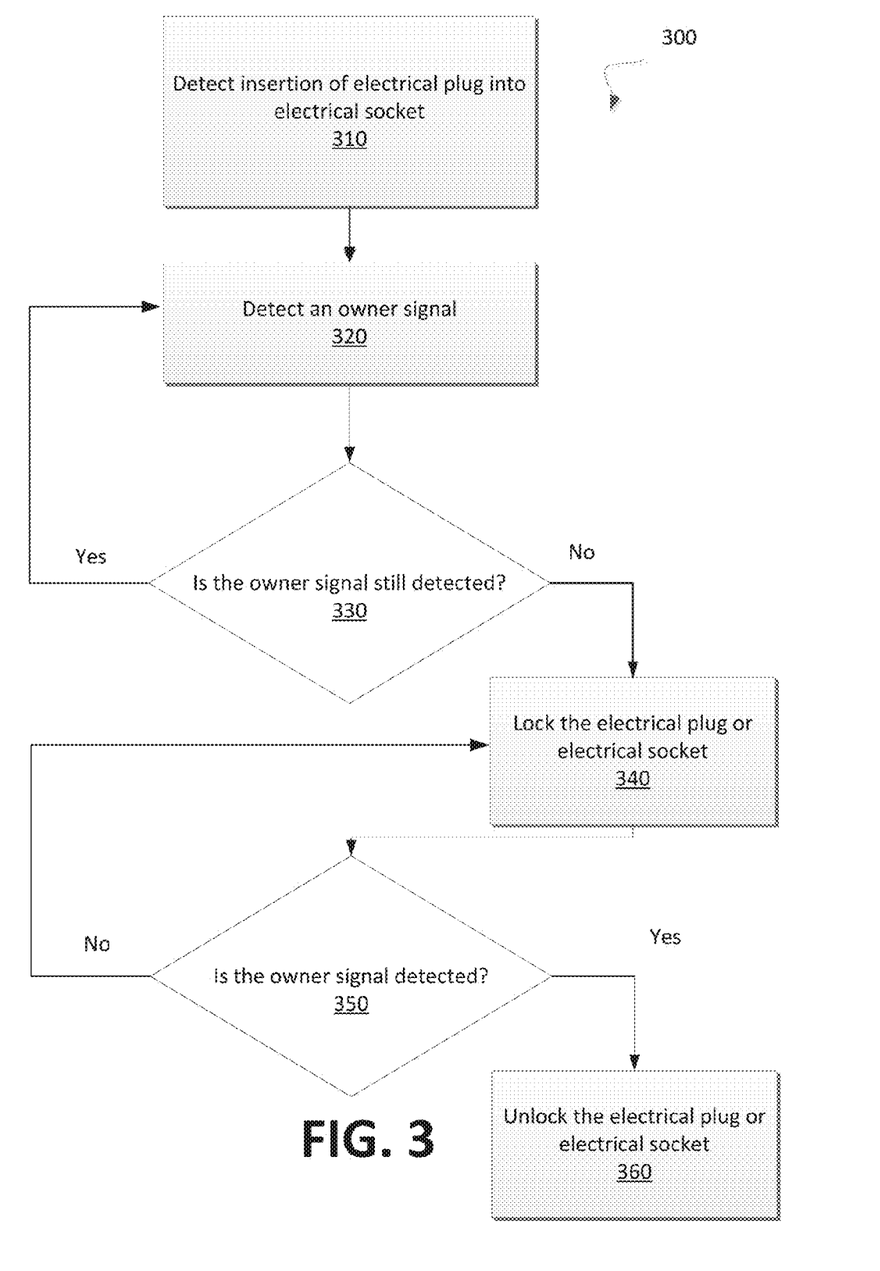
FIG. 3 illustrates a flow diagram of an example method for locking the charging connector inserted into a charging port associated with an electric vehicle in accordance with some embodiments.

FIG. 3 illustrates a flow diagram of an example method 300 for locking the charging connector inserted into a charging port associated with an electric vehicle in accordance with some embodiments. In general, the method 300 may lock into place a charging connector (e.g., charging connector 121) that has been inserted into a charging port (e.g., electrical charging port 111) of an electric vehicle (e.g., electric vehicle 110) based on a signal (e.g., from an electronic key fob used for keyless entry into the electric vehicle) associated with an owner of the electric vehicle.

As shown in FIG. 3, at step 310, the insertion of the charging connector into the charging port may be detected. Furthermore, at step 320, an owner signal may be detected. In some embodiments, the owner signal may be a signal associated with the owner of the electric vehicle that includes the charging port. For example, the owner signal may be associated with a key or other device (e.g., a remote keyless entry key fob) that the owner carries to start an engine of the electric vehicle. Examples of such an owner signal includes, but is not limited to, a radio frequency identification (RFID) signal, remote keyless entry signal, etc. In some embodiments, the owner signal may be a signal associated with opening a door of the electric vehicle and/or starting an engine of the electric vehicle. For example, certain electric vehicles may not include a conventional physical key that must be inserted into a keyhole to open a door and/or start the engine of the electric vehicle. Instead, an owner of the electric vehicle may carry a signal device (e.g., the remote keyless entry key fob) that transmits a signal (e.g., an owner signal) that is detected by one or more components or sensors of the electric vehicle. As such, the owner of the electric vehicle may open doors of the electric vehicle when the owner is in possession of the signal device and may start the engine of the electric vehicle when in possession of the signal device (e.g., if the signal device is at or near the electric vehicle such that a sensor of the electric vehicle detects the owner signal). As such, the signal device may also be used to control the locking and/or unlocking of the charging connector into the charging port. For example, at step 330, a determination as to whether the owner signal is detected may be made. If the owner signal is detected, then the charging port may not be placed or configured into the locked state. For example, the charging connector will not be locked into the charging port while the owner signal is at or near the electric vehicle. However, if it is determined that the owner signal is no longer detected, then at step 340, the charging port may be placed into a locked state. For example, the charging connector may be locked into the charging port when the owner signal is no longer detected. Next, at step 350, another determination may be made with regard to the owner signal. If the owner signal is not detected, then the charging port may remain in the locked state and the charging connector may thus remain locked into the charging port. However, if the owner signal is finally detected to return, then at step 360, the charging port may be switched from the locked state to the unlocked state. For example, the charging connector may be unlocked from the charging port when the owner signal is detected to return to the electric vehicle.

As such, the charging connector may be inserted into the charging port. The charging port may be configured to switch between the locked state and the unlocked state in response to an owner signal being detected or not being detected by the electric vehicle. For example, the charging connector may be inserted into the charging port. The electric vehicle or a sensor associated with the electric vehicle may detect the owner signal at or near the electric vehicle. In response to the detection of the owner signal after the insertion of the charging connector into the charging port, the charging port may not be placed into the locked state (e.g., the charging connector is not locked into the charging port at first). However, once the owner signal is no longer detected after the insertion of the charging connector into the charging port, then the charging port may be placed into the locked state. As such, the charging connector may be locked into the charging port. However, once the owner signal is detected again at a subsequent time period after the charging port has been placed into the locked state (or after a predetermined time period after the charging port being placed into the locked state), then the charging port may be switched from the locked state to the unlocked state such that the charging connector may be removed from the charging port.

In some embodiments, a message may be transmitted to the owner of the electric vehicle in response to the battery being charged or the charging connector being disconnected from the charging port. For example, an onboard computer or other device of the electric vehicle may store a phone number of a mobile communications device or other contact information (e.g., email) of the owner. When the battery is charged or when the charging connector has become disconnected from the charging port of the electric vehicle, then a message may be transmitted to the mobile communications device. For example, a text message or phone call may be transmitted to the mobile communications device. The message may include information to alert the owner of the electric vehicle that the charging of the battery has completed and/or that the charging connector has been disconnected from the electric vehicle.

In some embodiments, the locking and unlocking of the charging port (or charging connector) as disclosed herein may be in response to a fingerprint detection. For example, the charging connector may be placed into the charging connector and the charging port may be placed in a locked state. In some embodiments, the charging port may be switched from the locked state to the unlocked state if an accepted or recognized fingerprint (e.g., the owner's fingerprint) is detected on the charging connector, charging port, or another sensor or component of the electric vehicle.

In some embodiments, the locking and unlocking may be done at the charging station. For example, the electric vehicle may include or be associated with a charging connector that is inserted or plugged into a charging port of a charging station. In such a case, the charging station may perform the systems and methods disclosed herein. For example, the charging port of the charging station may be placed into the locked state and unlocked state as disclosed herein.

Although the above disclosure discusses a charging port for an electric vehicle, one will appreciate that the systems and methods disclosed herein may be applied to any device, systems, or item that is associated with a battery. As such, an electrical charging port of any type of item (e.g., an electronic device, smart phone, computer, etc.) may use the systems and methods disclosed herein.

Cell Phone Implementation

As previously described, the features of the above disclosure with regard to the locking of the charging port for an electric vehicle may also be applied to other devices such as a cell phone. For example, the charging port of a cell phone may be locked in response to a battery threshold value as previously disclosed. Additionally, the features described herein may be applied to devise such as a tablet computer or a laptop computer.

Figure 4:
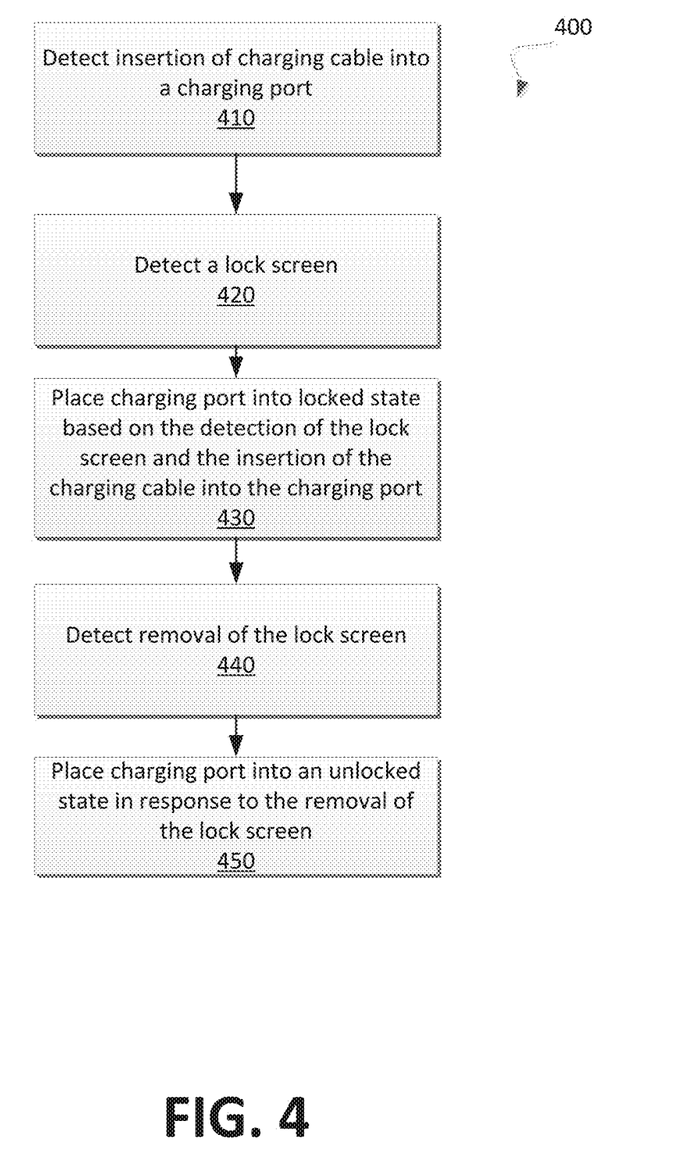
FIG. 4 is a method to lock a charging port of an example cell phone in accordance with some embodiments.

FIG. 4 is a method 400 to lock a charging port of an example cell phone in accordance with some embodiments. In general, the method 400 may be used to lock a cell phone based on the battery level of the cell phone and a state of the cell phone.

As shown in FIG. 4, the method 400 may detect, at step 410, the insertion of a charging cable into the charging port of the cell phone. Furthermore, at step 420, the lock state of the cell phone may be detected. In some embodiments, the lock state of the cell phone may be a state of the cell phone when a lock screen is displayed. In some embodiments, the lock screen may be a screen where at least some functionality of the cell phone cannot be accessed until a password, passcode, gesture, fingerprint, or other such action, security measure, or user identification is performed on the cell phone or the display of the cell phone. At step 430, the charging port of the cell phone may be placed in a locked state in response to the cell phone being in the lock state while the charging cable has been inserted into the charging port of the cell phone. For example, the charging port of the cell phone may first be in an unlocked state and the charging port of the cell phone may be configured or switched to the locked state in response to the cell phone being charged by way of the charging cable being inserted into the charging port as well as the cell phone having been placed in the locked state (e.g., the lock screen of the cell phone being displayed). At step 440, an unlock state of the cell phone may be detected. For example, a user of the cell phone may have entered a password, passcode, gesture, activated a fingerprint sensor, or other security authorization feature of the cell phone in order to remove the lock screen and no longer place the cell phone in the locked state. As such, at step 450, the charging port of the cell phone may also be placed in the unlocked state in response to the cell phone having exited the lock screen.

As such, a charging port of a cell phone may be placed in a locked state in response to the cell phone displaying a lock screen. When the cell phone no longer displays the lock screen (e.g., a user has entered a security input or authorization feature), the charging port of the cell phone may then be placed in an unlocked state so that the charging cable may be removed from the charging port.

In some embodiments, a security feature of the cell phone may be activated if the cell phone has been disconnected from the charging cable. For example, in response to the cell phone being disconnected from the charging cable (e.g., no longer being charged) while the cell phone is in the locked state, the cell phone may create an audio alert. In some embodiments, the audio alert may be used to attract attention of other nearby people so that a potential thief may be deterred from stealing the cell phone while the cell phone is being charged.

Wireless Charging Implementation

Aspects of the present disclosure may also be applied to wireless charging or power transmission. For example, wireless charging transmitter components may transmit energy (e.g., through magnetic induction and/or magnetic resonance) for wireless charging of a battery of a vehicle, cell phone, or any other device requiring a battery or charging functionality.

The battery level of an electric vehicle or battery-powered device may be used to turn on and/or turn off the wireless charging transmitter component. For example, the wireless charging transmitter component may turn on in response to a low threshold battery level and may subsequently turn off in response to the battery level satisfying (e.g., meeting or exceeding) a threshold value. For example, an electric vehicle may be parked over a wireless charging transmitter component. In some embodiments, a system of the electric vehicle may transmit a notification that includes information of the electric vehicle's battery charge level. The wireless charging transmitter component may transmit energy to the electric vehicle if the battery charge level does not satisfy a threshold value. Once the battery charge level has been identified as satisfying the threshold value (e.g., from a notification), and then the wireless charging transmitter component may no longer transmit the energy to the electric vehicle and may be turned off. Similar methods may also be used to control the wireless charging of a cell phone or other electronic communications device. For example, a wireless charging pad or other such wireless charging transmitter component may transmit wireless energy to the cell phone. In some embodiments, the cell phone may communicate or notify the wireless transmitter or wireless charging pad of the battery level of the cell phone. For example, the cell phone may broadcast such a notification or may transmit a text message communicating its current battery level. The wireless transmitter may receive the notification or information in the notification and may initiate wireless power transmission in response to the notification and the current battery level being below a threshold value. Once the cell phone battery level satisfies a threshold value (e.g., the battery level exceeds or meets a minimum battery level percentage), then the cell phone may transmit a second notification or text message and the wireless power transmitter or wireless charging pad may stop transmitting energy in response to the battery level satisfying the threshold value.

In some embodiments, the wireless transmitter may initiate wireless energy transmission to recharge a battery in response to a weight. For example, a wireless charging pad or wireless power transmitter may initiate wireless charging of a cell phone if the wireless charging pad detects a weight being placed upon it. In some embodiments, the wireless power transmission may then stop if the weight is no longer placed upon the wireless charging pad. In alternative embodiments, the wireless power transmission may stop once the battery charge level satisfies a threshold value as previously discussed. Similar methods may also be used for electric vehicle charging. For example, a wireless charging system may be placed under a parking spot or area of a garage. A weight (e.g., the electric vehicle) may be detected above the wireless charging system. If the weight satisfies a threshold value (e.g., the weight meets or exceeds a predefined weight amount), then the wireless transmission of power may begin and the battery of the electric vehicle may be recharged. Furthermore, the wireless transmission of power may stop once the weight is no longer detected or the weight no longer satisfies the threshold value (e.g., the electric vehicle has moved or been driven away) and/or if the battery level of the electric vehicle satisfies the threshold value.

In some embodiments, the location of the battery of electric vehicles may vary based on a model or type of the electric vehicle. For example, batteries may be located at the front, rear, left, right, or other portions of the electric vehicle. Such variation in the location of the battery of electric vehicles may result in inefficient use of wireless power transmission. For example, the wireless power transmitter may be located underneath a parking space, garage area, etc. In some embodiments, the wireless power transmitter may be a large magnetic induction coil. For example, the magnetic induction coil may be sized or proportioned or substantially cover a large portion of the parking space or garage area. However, the battery of the electric vehicle may only be above a smaller portion of the parking space or garage area. As such, a more selective activation of the magnetic induction coil of the wireless power transmitter to target the specific area where the battery of the electric vehicle may provide for a more efficient transmission of energy. As such, in some embodiments, portions of the wireless power transmitter may be activated based on a location of a battery. For example, a signal from an electric vehicle may be received. In some embodiments, the signal may identify a type of the electric vehicle. For example, the identification may be that of a make, model, and/or year of the electric vehicle. In alternative embodiments, the signal may identify a location of the battery of the electric vehicle. In some embodiments, the signal may be received and a location of the battery of the electric vehicle may be determined based on the type of electric vehicle. In response to identifying the location of the battery of the electric vehicle, portions of the wireless power transmitter may be activated. For example, magnetic induction or resonance coil portions (e.g., a coil or component used in the wireless transmission of power) may be activated in response to the location of the battery of the electric vehicle. In some embodiments, the activated portions of the wireless power transmitter may transmit the wireless energy while the other portions (e.g., the inactivated portions that may not be near the location of the battery) may not transmit wireless power.

In some embodiments, the activation or use of portions of the magnetic induction coil may be based on the location of the battery or wireless power receiver of an electric vehicle. For example, the location of the wireless power receiver of an electric vehicle may received in the signal and portions of the wireless power transmitter (e.g., portions of a magnetic induction coil or a particular magnetic resonance coil from multiple coils or a particular magnetic induction coil from multiple coils) may be activated based on a signal identifying the location of the wireless power receiver of the electric vehicle.

In some embodiments, a portion of a wireless power transmitter may be activated based on location of the electric vehicle. For example, the electric vehicle may be on a road. In some embodiments, multiple wireless power transmitters may be embedded beneath the road such that when the electric vehicle passes over the wireless power transmitters, the electric vehicle may receive some wireless power from the buried wireless power transmitters. The buried wireless power transmitters may be activated based on the location of the electric vehicle. For example, the electric vehicle may pass over a first wireless power transmitter and in response to the electric vehicle being located over the first wireless power transmitter, a second wireless power transmitter may be activated such that when the electric vehicle is expected to be over the second wireless transmitter it will already be activated and immediately provide wireless power to the electric vehicle as it passes over the second wireless transmitter. In some embodiments, the velocity of the electric vehicle may be detected and also used to activate a wireless power transmitter. For example, the velocity of the electric vehicle may be calculated based on the time the electric vehicle takes to go from a first wireless power transmitter and a second wireless power transmitter and the distance between the first and second wireless power transmitters. As such, a third wireless power transmitter may be activated based on the velocity and/or location of the electric vehicle. Furthermore, in some embodiments, the electric vehicle may provide and/or transmit a signal indicating the battery level of the electric vehicle is below a threshold value. The activation and providing of wireless power from the third wireless power transmitter may further be based on the electric vehicle transmitting the signal so that the third wireless power transmitter may be activated to provide the electric vehicle with wireless power based on a signal from the first and/or second wireless transmitter based on the location and/or velocity of the electric vehicle passing over the first and second wireless transmitters as well as the signal from the electric vehicle that indicates the battery level of the electric vehicle (e.g., the signal from the electric vehicle is indicating that the electric vehicle is seeking wireless power for recharging).

Figure 5:
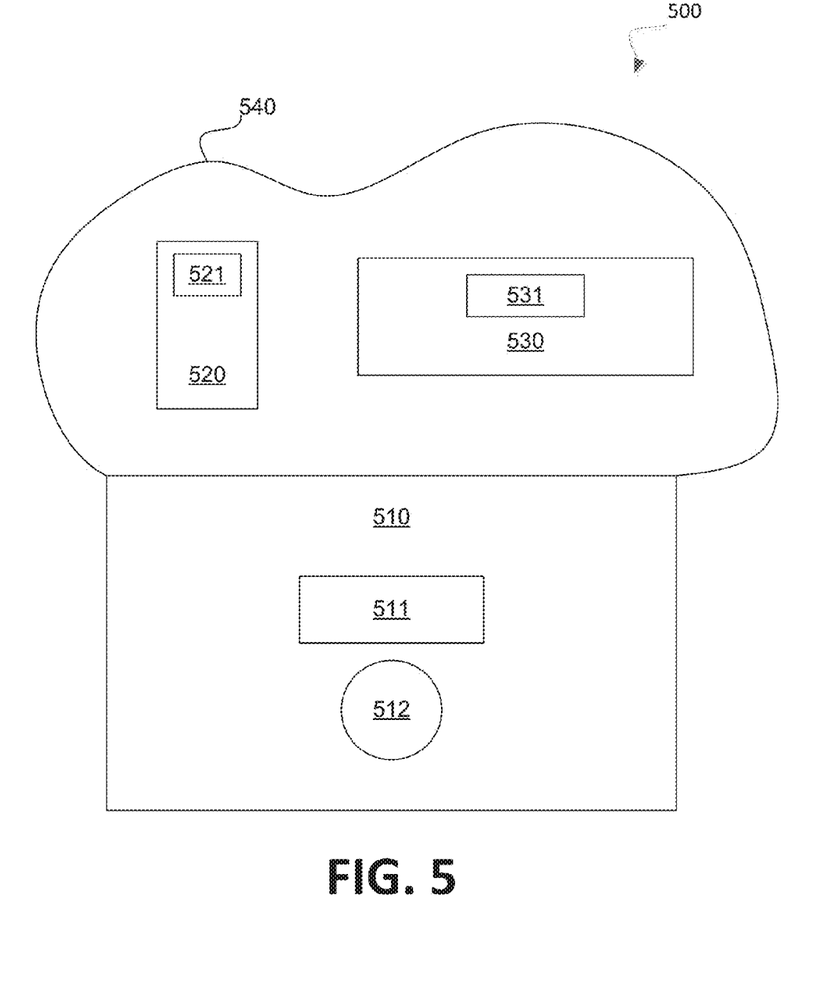
FIG. 5 illustrates an example wireless power transfer (WPT) environment in accordance with some embodiments of the disclosure.

FIG. 5 illustrates an example wireless power transfer (WPT) environment 500. In general, the WPT environment 500 may include at least one wireless power transmitter and one or more devices each with at least one wireless power receiver. In some embodiments, the charging (e.g., wireless power transmission) of each of the one or more devices may be managed or controlled.

As shown in FIG. 5, the wireless power transfer environment 500 may include a wireless power charging pad 510, a device 520 (e.g., a cellular phone such as a smart phone), and a device 530 (e.g., a tablet computer, mp3 player, or another electronic device with a battery). Furthermore, the wireless power charging pad 510 may include a wireless power transmitter 511, the device 520 may include a wireless power receiver 521, and the device 530 may include a wireless power receiver 531. In some embodiments, the wireless power transmitter 511 and/or the wireless charging pad 510 may be associated with a near field 540. The near field 540 may be a zone or area of an electromagnetic field generated by the wireless charging pad 510 or the wireless power transmitter 511 in which the wireless charging pad 510 may transmit wireless power with its wireless power transmitter 511. For example, devices with a wireless power receiver that are within the near field 540 may receive wireless power from the wireless power transmitter 511 and devices with a wireless power receiver that are outside of the near field 540 may not receive wireless power from the wireless power transmitter 511.

The wireless power transfer environment 500 may include a plurality of devices that are simultaneously within the near field 540. For example, the device 520 and the device 530 may both be in the near field 540. As such, the wireless power receivers of both devices 520 and 530 may receive wireless power from the wireless power transmitter 511. In some embodiments, a user or owner of both devices 520 and 530 may prefer to have one of the devices receive wireless power device before the other the other device. However, if both devices 520 and 530 are receiving wireless power from the same wireless transmitter 511, then the user's preferred device may not receive an optimal level of wireless power and charging. Such a situation may result in a user's preferred device having a lower than expected battery level.

To address such an issue, a user may place a priority or other factor that may be used to provide wireless power to the devices 520 and 530. For example, a user may wish to have his or her cell phone (e.g., device 520) be charged to a particular threshold battery level or fully charged by the wireless power from the wireless power transmitter 511 before the wireless power transmitter 511 may initiate charging or providing wireless power to a tablet computer (e.g., device 530). As such, in some embodiments, the wireless power transmitter 511 may first transmit wireless power to the wireless power receiver 521 of the device 520. Once the battery charge level of the device 520 has satisfied a threshold charge level (e.g., the battery charge level meets or exceed a predefined value), then the device 520 may transmit a communication to the wireless power transmitter 511 and/or a component of the wireless charging pad 510. In response to such a communication from the device 520, the wireless charging transmitter 511 may no longer transmit wireless power to the wireless power receiver 521 of the device 520. Subsequently, the wireless charging transmitter 511 may then provide wireless power to the wireless power receiver 531 of the device 530.

Thus, a user may place a higher wireless power charging priority on the device 520 and a lower wireless power charging priority on the device 530. In some embodiments, the wireless power charging priorities may be specified or defined by when the devices 520 and 530 were placed into the near field 540. For example, a user may first place the device 520 into the near field 540. After a period of time, the user may then place the device 530 into the near field 540. In response to such placement of the devices in the near field 540, the wireless power charging priorities may be assigned to the devices 520 and 530. For example, the first device placed or detected as being placed in the near field 540 may be assigned a first or higher priority than the second device that has been placed or detected as being placed in the near field 540. As such, in the above referenced example, the device 520 may receive a higher wireless power charging priority since it was first placed in the near field 540 and the device 530 may receive a lower wireless power charging priority since it was placed later in the near field 540.

In some embodiments, the wireless power charging priority may be assigned or determined based on when each of the devices are placed onto the wireless charging pad 510. For example, a user may place the device 520 onto the wireless charging pad 510 and after a period of time may place the device 530 onto the wireless charging pad 510. In such an example, the device 520 that was first placed onto the wireless charging pad 510 may be assigned a higher wireless charging priority while the device 530 that was later placed onto the wireless charging pad 510 may be assigned the lower wireless power charging priority.

In some embodiments, the wireless charging pad 510 may include functionality to assist a user with regard to the assigning of the wireless charging priority. For example, the wireless charging pad 510 may include an indication light 512 or other indicator to indicate when a device has been detected within the near field 540 and/or on the wireless charging pad. For example, a user may place the device 520 into the near field 540 or on the wireless charging pad 510 and a light 512 may come on, flash, blink, change colors, etc. or an audible sound may be created in response to the device 520 being detected. Such an indicator will then alert the user that the device 520 has been assigned a wireless power charging priority. Subsequently, the user may place the device 530 after receiving the indication or alert to assure that the device 530 will be assigned a lower wireless power charging priority.

The above disclosure may also be applied to a wireless charging pad that does not generate a near field 540. For example, the above disclosure with regard to the wireless power charging priorities may be used with relation to wireless charging pads using magnetic induction techniques. For example, the wireless charging pad may include a plurality of magnetic induction coils. A first device may be placed on a first magnetic induction coil and a second device may be placed on a second magnetic induction coil. If the first device was first placed onto the wireless charging pad then the first device may be assigned a higher wireless power charging priority than the second device which may be assigned a lower wireless power charging priority if it is placed onto the wireless charging pad after the first device. In some embodiments, the activation of the magnetic induction coils may then be based on the wireless power charging priorities. For example, the first magnetic induction coil may first be activated and may then be deactivated once the batter charge level of the first device satisfies a threshold level. Next, in response to the first magnetic induction coil being deactivated, the second magnetic induction coil may then be activated to charge the second device.

As such, devices may be charged via wireless power transmission based on a priority assigned to the devices. In some embodiments, the priority may determine which device is provided wireless power first and which device will be provided wireless power after the first device has been provided the wireless power. However, in the same or alternative embodiments, the priorities disclosed herein may be used to determine the charging rate of devices by the wireless power transmission. The priorities assigned to devices may determine the wireless power charging rate for each of the devices. For example, a first device may be assigned a first priority and a second device may be assigned a second priority. The first device may be provided wireless power charging at a first rate based on the first priority and the second device may be provided wireless power charging at a second rate based on the second priority. In some embodiments, the first rate may be at a higher rate than the second rate so that the wireless power charging of the first device is faster than the wireless power changing of the second device. Thus, a wireless power transmitter may be used to provide wireless power to the first device and second device based on priorities assigned to each of the devices.

Accordingly, a first priority may be assigned to a first device. In some embodiments, the first priority may be determined and assigned based on a time for the first device to enter the near field. In the same or alternative embodiments, the first priority may be determined and assigned to the first device based on an expected time for when the first device will be removed from a wireless charging pad and/or a near field associated with a wireless charging pad. For example, the first device may communicate or transmit a signal to the wireless charging pad a particular time that the first device will be removed from the wireless charging pad and/or the near field. For example, a user may specify that the first device will be removed in the morning and that a second device will be removed in the evening. The wireless charging pad may thus provide wireless power to the first device in order to ensure that the first device will have a full battery or a battery that satisfies a threshold value in the morning and that the second device will have a full battery or a battery that satisfies the threshold value in the evening.

Alternatively, in some embodiments, a priority may be assigned to a device based on a purchase or transaction. For example, at a particular location (e.g., a store or a coffee shop), a wireless power charging capability may be provided to devices at the location. In some embodiments, a user may initiate an online transaction using his or her device and in response to the online transaction (e.g., paying a fee, viewing an advertisement, taking a survey, using a device to initiate a purchase, etc.), the priority of the user's device may be higher than another device that has not initiated the online transaction.

Figure 6:
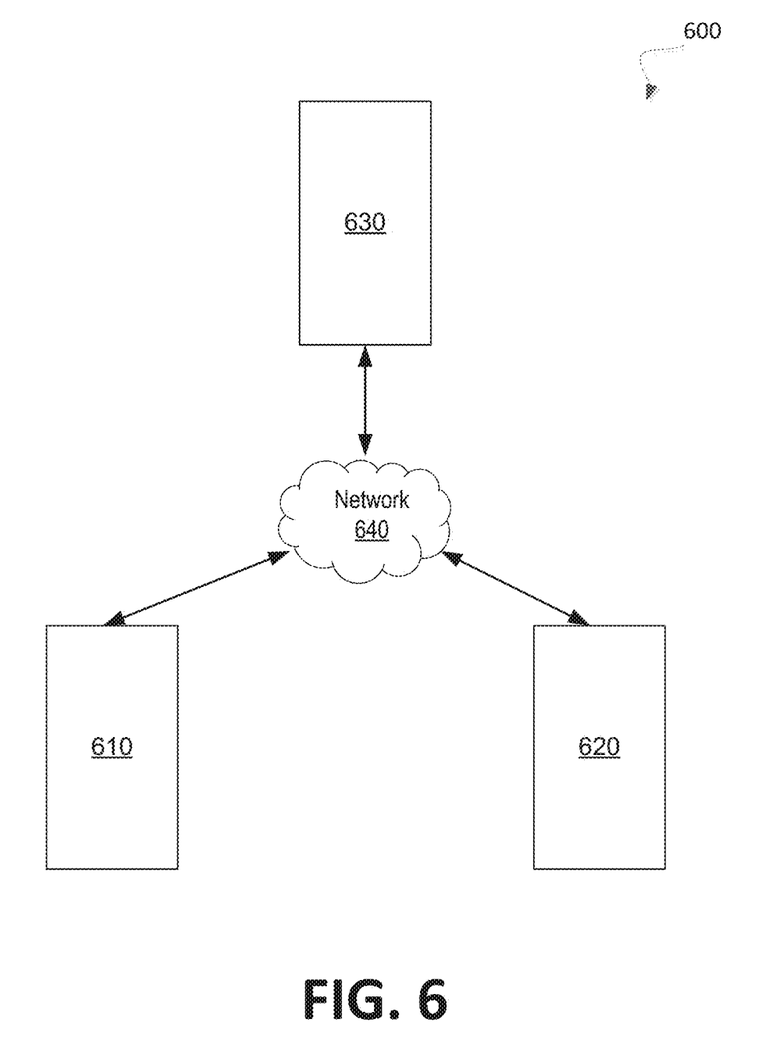
FIG. 6 illustrates an example environment to transmit wireless power to one or more devices in accordance with some embodiments.

FIG. 6 illustrates an example environment 600 to transmit wireless power to one or more devices. In general, the environment 600 may use a location feature of a device to activate a wireless power transmitter.

As shown in FIG. 6, the environment 600 may include a wireless power transmitter 610. In some embodiments, the wireless power transmitter 610 may be embedded into a wall (e.g., replacing a wall socket) or may be a stand alone component in a building. The wireless power transmitter 610 may be used to provide wireless power to at least one device 620. In some embodiments, the device may be a cellular phone (e.g., a smart phone). The device 620 may include a location functionality or feature. For example, the device 620 may include a Global Positioning System (GPS) feature. As such, the device 620 may include functionality to determine location related information associated with the device's current location. In some embodiments, the device 620 may transmit the location related information to a server 630. For example, the device 620 may transmit its current location (e.g., GPS coordinates, or other such location coordinates or information) to the server 630. In the same or alternative embodiments, the wireless power transmitter 610 may communicate with the server 630. For example, the wireless power transmitter may be connected to a network 640 (e.g., the Internet) that may facilitate communication between the wireless power transmitter 610 and the server 630. In some embodiments, the server 630 may transmit a communication or notification to the wireless power transmitter 610. For example, the server 630 may receive the location related information from the device 620. If the received location related information matches with a defined location stored at the server 630, then the server 630 may transmit a message or notification to the wireless power transmitter 610 in response to the received location related information matching or corresponding to a predefined location. In some embodiments, in response to the server transmitting a message or notification to the wireless power transmitter 610, the wireless power transmitter 610 may activate to transmit wireless power to the device.

As such, a device may transmit its current location to a server. The server may receive the current location of the device and determine if the current location matches a previously defined location. If the current location of the device matches the previously defined location, then the server may transmit a communication to the wireless power transmitter. In some embodiments, the wireless power transmitter may first be inactivated (e.g., not transmitting wireless power or not actively detecting nearby devices). In response to receiving the communication from the server, the wireless power transmitter may then be activated and search for the device and subsequently transmit wireless power to the device.

In some embodiments, the communication or notification sent to the wireless power transmitter 610 from the server 630 may include an identification or other information associated with the device. For example, the communication or notification may include information used by the device to communication and/or receive wireless power from a wireless power transmitter. In some embodiments, such information may include a frequency at which a wireless power receiver of the device may receive wireless power from the wireless power transmitter.

In some embodiments, a user device may display a user interface to select a wireless power network to provide wireless power to a device. For example, the user interface may display at least one wireless power network. For example, the user interface may include a list of available wireless power networks. Each of the available wireless power networks may be associated with a wireless power signal strength. For example, a first wireless power network may be associated with a first wireless power signal strength, a second wireless power network may be associated with a second wireless power signal strength, and a third wireless power network may be associated with a third wireless power signal strength. In some embodiments, a user of the device displaying the user interface may select one of the available wireless power networks to enable the device to connect and to receive wireless power from the selected wireless power network. For example, if the user selects the first wireless power network, then the device may be coupled to the first wireless power network. In some embodiments, the selection of the wireless power network in the user interface may cause a resonance tuning component or circuit of the wireless power receiver of the device to be changed based on a resonance frequency of the selected wireless power network. As such, in some embodiments, the selection of the wireless power network in the user interface may specify a particular resonance frequency for the device to operate on and/or which wireless power transmitter for the device to send a communication to.

Figure 7:
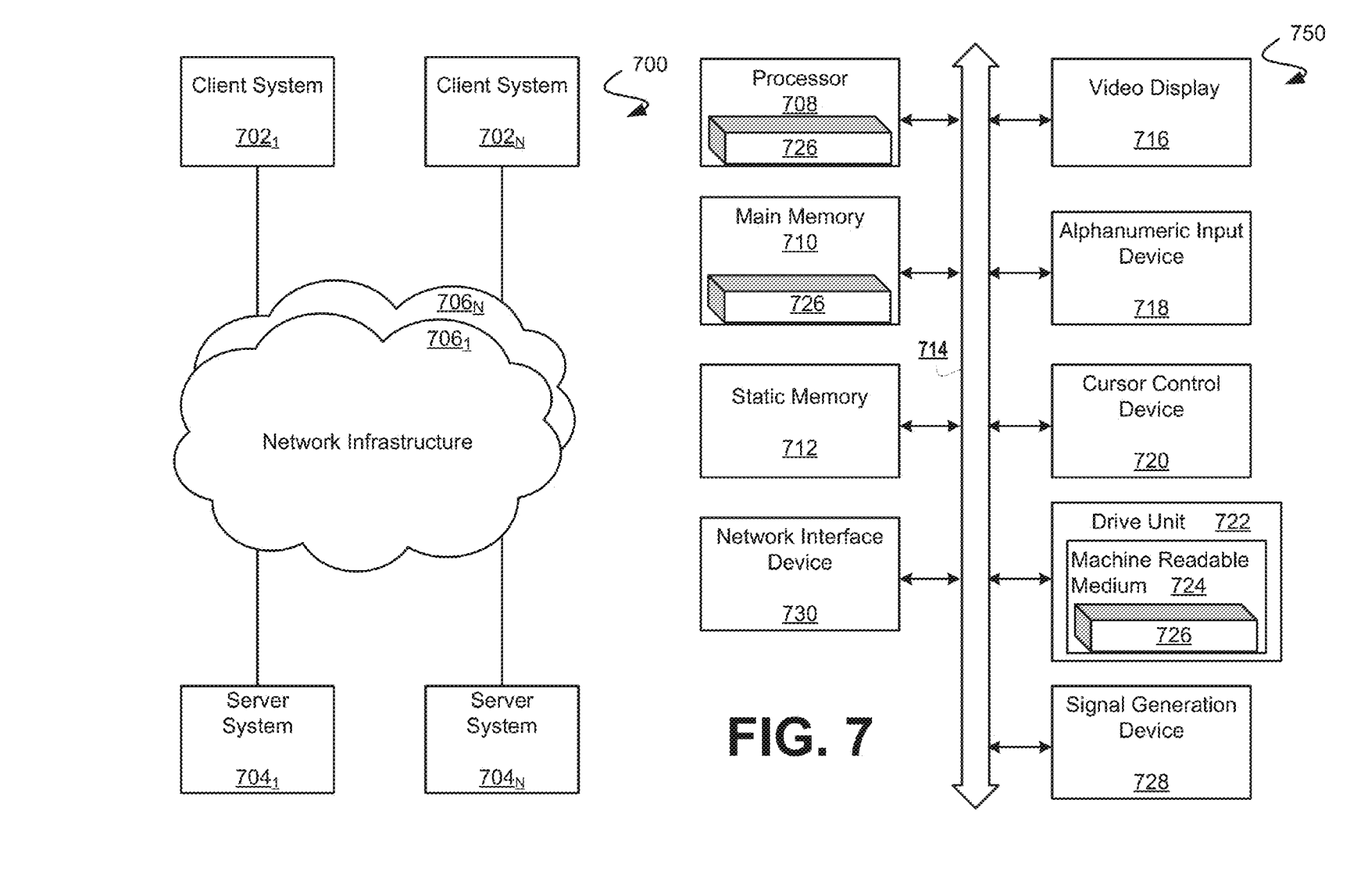
FIG. 7 illustrates an embodiment of a computer system and a network system that incorporates the mobile wish list systems and methods of the present disclosure.

FIG. 7 is a diagrammatic representation of a network 700, including nodes for client computer systems $702_1$ through $702_N$, nodes for server computer systems $704_1$ through $704_N$, nodes for network infrastructure 706₁ through 706ₙ, any of which nodes may comprise a machine 750 within which a set of instructions for causing the machine to perform any one of the techniques discussed above may be executed. The embodiment shown is purely exemplary, and might be implemented in the context of one or more of the figures herein.

Any node of the network 700 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 750 includes a processor 708 (e.g. a processor core, a microprocessor, a computing device, etc.), a main memory 710 and a static memory 712, which communicate with each other via a bus 714. The machine 750 may further include a display unit 716 that may comprise a touch-screen, or a liquid crystal display (LCD), or a light emitting diode (LED) display, or a cathode ray tube (CRT). As shown, the computer system 750 also includes a human input/output (I/O) device 718 (e.g. a keyboard, an alphanumeric keypad, etc.), a pointing device 720 (e.g. a mouse, a touch screen, etc.), a drive unit 722 (e.g. a disk drive unit, a CD/DVD drive, a tangible computer readable removable media drive, an SSD storage device, etc.), a signal generation device 728 (e.g. a speaker, an audio output, etc.), and a network interface device 730 (e.g. an Ethernet interface, a wired network interface, a wireless network interface, a propagated signal interface, etc.).

The drive unit 722 includes a machine-readable medium 724 on which is stored a set of instructions (i.e. software, firmware, middleware, etc.) 726 embodying any one, or all, of the methodologies described above. The set of instructions 726 is also shown to reside, completely or at least partially, within the main memory 710 and/or within the processor 608. The set of instructions 726 may further be transmitted or received via the network interface device 730 over the network bus 714.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present disclosure has been described in terms of specific exemplary embodiments, it will be appreciated that various modifications and alterations might be made by those skilled in the art without departing from the spirit and scope of the disclosure. The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein, but is to be accorded the widest scope consistent with the principles and novel features disclosed herein.

What is claimed is:

1. A method comprising:
   identifying a connection between a charging connector and a charging port of an electric vehicle;
   detecting an owner signal that is associated with unlocking or opening a door of the electric vehicle;
   determining a loss of the owner signal that is associated with unlocking or opening the door so that the owner signal is no longer detected;
   locking the charging port with the charging connector in response to the identification of the connection between the charging connector and the charging port of the electric vehicle and the determination of the loss of the owner signal that is associated with unlocking or opening the door of the electric vehicle;
   monitoring a charge level of a battery of the electric vehicle; and
   unlocking, by a processing device, the charging port based on the charge level of the battery satisfying a threshold value.

2. The method as set forth in claim 1, wherein the threshold value corresponds to the charge level of the battery being full.

3. The method as set forth in claim 1, wherein the charge level of the battery satisfies the threshold value when the charge level meets or exceeds the threshold value.

4. The method as set forth in claim 1, wherein the locking of the charging port with the charging connector prevents a removal of the charging port from the charging connector.

5. The method as set forth in claim 1, further comprising:
   detecting a return of the owner signal after the identification of the loss of the owner signal, wherein the unlocking of the charging port is further based on the detection of the owner signal after the identification of the loss of the owner signal.

6. The method as set forth in claim 1, wherein the charging connector is associated with the electric vehicle and the battery is associated with the electric vehicle, and wherein the battery is charged based on the connection between the charging port and the charging connector.

7. A non-transitory computer readable medium carrying one or more instructions, wherein the one or more instructions, when executed by one or more processing devices, causes the one or more processing devices to perform operations comprising:
   identifying a connection between a charging connector and a charging port of an electric vehicle;

detecting an owner signal that is associated with starting an engine of the electric vehicle;

determining a loss of the owner signal that is associated with starting the engine so that the owner signal is no longer detected;

locking the charging port in response to the identification of the connection between the charging connector and the charging port of the electric vehicle and the determination of the loss of the owner signal that is associated with starting the engine of the electric vehicle;

monitoring a charge level of a battery of the electric vehicle; and unlocking the charging port based on the charge level of the battery satisfying a threshold value.

8. The non-transitory computer readable medium as set forth in claim 7, wherein the threshold value corresponds to the charge level of the battery being full.

9. The non-transitory computer readable medium as set forth in claim 7, wherein the charge level of the battery satisfies the threshold value when the charge level meets or exceeds the threshold value.

10. The non-transitory computer readable medium as set forth in claim 7, wherein the locking of the charging port with the charging connector prevents a removal of the charging port from the charging connector.

11. The non-transitory computer readable medium as set forth in claim 7, the operations further comprising:

detecting a return of the owner signal after the identification of the loss of the owner signal, wherein the unlocking of the charging port is further based on the detection of the owner signal after the identification of the loss of the owner signal.

12. The non-transitory computer readable medium as set forth in claim 7, wherein the charging connector is associated with the electric vehicle and the battery is associated with the electric vehicle, and wherein the battery is charged based on the connection between the charging port and the charging connector.

13. A system comprising:

a memory; and a processing device operatively coupled to the memory and to:

identify a connection between a charging connector and a charging port of an electric vehicle;

detect an owner signal that is associated with unlocking or opening a door of the electric vehicle;

determine a loss of the owner signal that is associated with unlocking or opening the door so that the owner signal is no longer detected;

lock the charging port in response to the identification of the connection between the charging connector and the charging port of the electric vehicle and the determination of the loss of the owner signal that is associated with unlocking or opening a door of the electric vehicle;

monitor a charge level of a battery of the electric vehicle; and unlock the charging port based on the charge level of the battery satisfying a threshold value.

14. The system as set forth in claim 13, wherein the threshold value corresponds to the charge level of the battery being full.

15. The system as set forth in claim 13, wherein the charge level of the battery satisfies the threshold value when the charge level meets or exceeds the threshold value.

16. The system as set forth in claim 13, wherein the locking of the charging port with the charging connector prevents a removal of the charging port from the charging connector.

17. The system as set forth in claim 13, wherein the processing device is further to:

detect a return of the owner signal after the identification of the loss of the owner signal, wherein the unlocking of the charging port is further based on the detection of the owner signal after the identification of the loss of the owner signal.

* * * * *